March 29, 1938. J. F. KACENA 2,112,778
TRESTLE
Filed Dec. 2, 1937
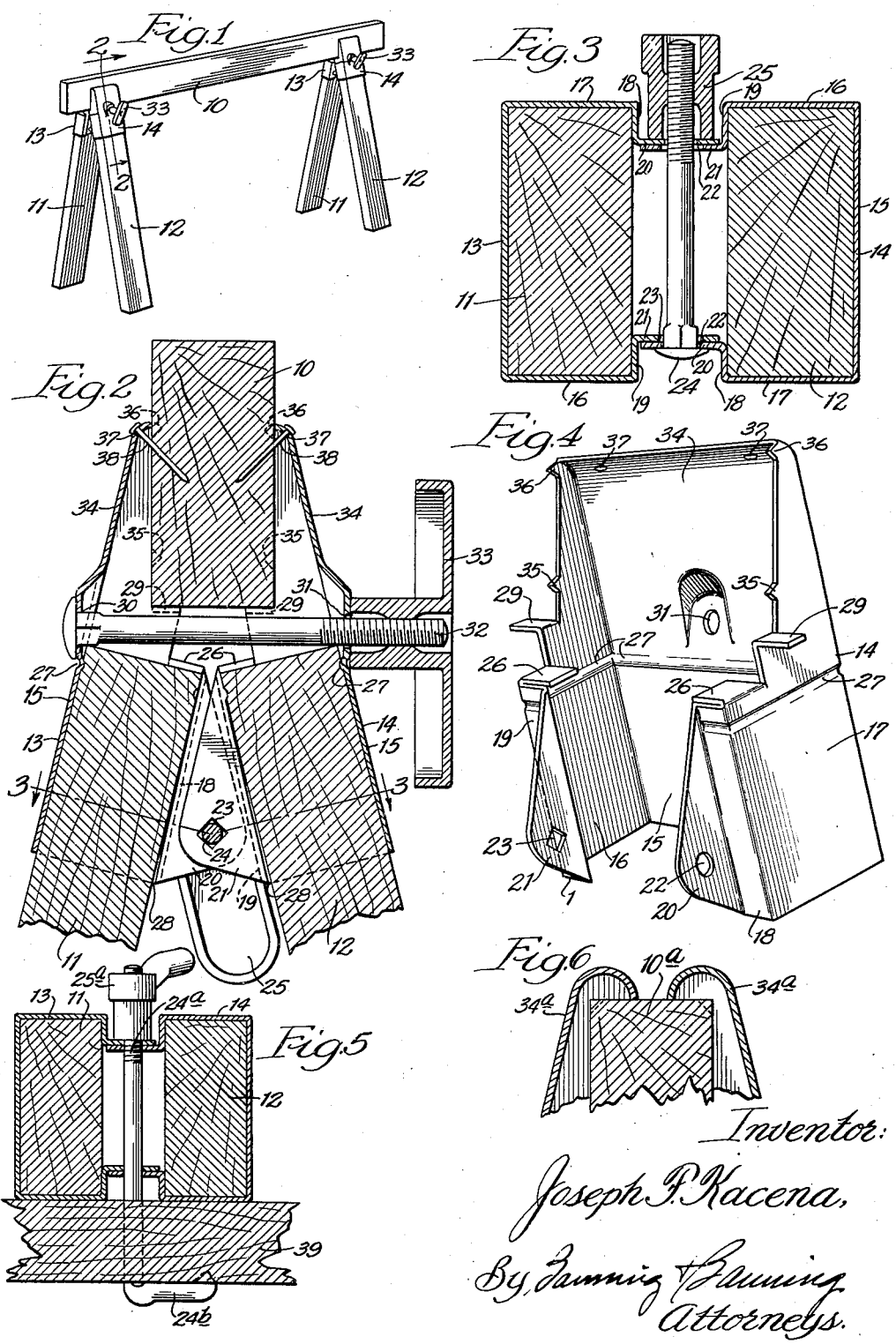
Inventor:
Joseph F. Kacena,
By Fanning & Fanning
Attorneys.

Patented Mar. 29, 1938

2,112,778

UNITED STATES PATENT OFFICE 2,112,778

TRESTLE

Joseph F. Kacena, Chicago, Ill.

Application December 2, 1937, Serial No. 177,712

4 Claims. (Cl. 304—5)

An object of this invention is to provide a simple and efficient form of trestle and one that can be easily assembled and disassembled.

Another object is to provide such a trestle which can readily be prepared for packing in a small space in units without completely disassembling.

This and other objects, as will hereinafter appear, are accomplished by this invention which is fully described in the following specification and shown in the accompanying drawing, in which—

Fig. 1 is a perspective view of a trestle or "horse" embodying the invention;

Fig. 2 is a partial enlarged vertical section on the line 2—2 of Fig. 1;

Fig. 3 is a transverse section on the broken line 3—3 of Fig. 2;

Fig. 4 is a perspective view of one of the sheet metal housings;

Fig. 5 is a section similar to Fig. 3 but on a somewhat smaller scale showing the use of a transverse brace member; and Fig. 6 is a view similar to Fig. 2 showing a modified form of the sheet metal housing.

The embodiment illustrated comprises a horizontal bar 10 supported on legs 11, 12, all these members preferably being 2" x 4" and secured together by means of pressed sheet metal housings 13, 14.

These housings are substantial duplicates and, as shown in Fig. 4, have a back 15, sides 16, 17 which surround the upper end of a leg as 12, the sides then being inwardly turned at 18, 19 to form ears 20, 21. The lower portions of these ears are provided with perforations 22, 23, the latter preferably being squared to receive the squared end of a carriage bolt 24. The wing nut or the like 25, Figs. 2 and 3, is screwed upon the outer end of the bolt and serves to draw the outer end of the sheet metal housing tightly about the legs 11 and 12, thereby serving to hold these housings firmly assembled on the legs so that they may be handled as units in which the two legs are thus secured together but are free to swing about the pivot 24 which may be a rivet if desired as will later be pointed out.

The metal of the housing is bent inwardly to form ledges 26 which accurately position the upper ends of the legs. A short distance below these ledges are located inwardly-extending beads 27 which engage the upper ends of the legs when driven thereover to further grip the same so as to maintain the housings assembled thereon. As shown in Fig. 2, the lower ends 28 of the housing are made slightly wider to assist in the easy assembly of the legs in the housing and together with the beads 27 cause the legs to wedge as they are inserted. By properly dimensioning these parts to grip the legs, the bolt 24 may be replaced by a rivet.

Some distance above the ledges 26 are placed ledges 29 which preferably extend outwardly and upon which rests the horizontal bar 10.

The housings 13, 14 are provided with openings 30, 31 through which passes a bolt 32 which has a wing nut 33. This wing nut, like the similar wing nut 25, preferably is recessed as shown so as to protect the threads of the nut as well as the threads of the bolt on which it is placed.

The upper portion 34 of the housing is adapted to engage the horizontal bar as clearly shown in Fig. 2 and is provided with teeth 35, 36 as well as an opening 37 through which may be inserted a nail 38 for more firmly fixing the housing on the horizontal bar. Ordinarily, however, these nails will not be needed as the tightening of the wing nut 33 on the bolt 32 usually is all that is required for this purpose. Even without the bolt 32, the jaws 34 will have a certain gripping action due to the fact that the legs tend to spread at the bottom and to swing about the pivot 24 as weight is applied to the trestle.

For certain purposes, it may be desirable to have the upper portion 34a of the housing extend up over the horizontal bar 10a, Fig. 6. Such a construction will insure a firm grip of the housing on the horizontal bar even without the bolt 32.

Again, it may be desirable to use a transverse brace from one trestle frame to another or from a trestle to ground or to some other stationary object. For this purpose, I have shown in Fig. 5 a trestle having a modified form of bolt 24a and a wing nut 25a. This bolt has a hook 24b which is adapted to engage a transversely-placed wooden brace member 39 which, as previously stated, may be similarly connected to another trestle or to any stationary object for the purpose of assisting in steadying the trestle to which it is applied.

Thus it will be seen that I have provided a very simple and efficient form of trestle and one which utilizes wooden members with a minimum of injury thereto. In this connection, it will be observed that the bolt 32 does not pass through or in any way mar any of the wooden members. Also, no trimming of any of the wooden members is required in order to utilize them in the housing and its associated parts.

In disassembling the trestle of Figs. 1 and 2 for transport or for storage, the nut 33 is released so that the horizontal bar 10 can be removed and the legs 11, 12 can be folded into contact with each other.

While I have shown and described but a few embodiments of my invention, it is to be understood that it is capable of many modifications. Changes, therefore, in the construction and arrangement may be made which do not depart from the spirit and scope of the appended claims.

I claim:

1. In a trestle, a horizontal bar, spaced supporting legs, a pressed sheet metal housing surrounding the upper end of each leg, said housings being arranged in facing pairs, each housing having laterally-extending perforated ears and having an upwardly-extending jaw to engage the horizontal bar, a bolt extending through the perforations for drawing the housings about the legs, and a transversely-arranged bolt passing through the housings above the legs and beneath the transverse bar for firmly holding the jaws in contact with the horizontal bar to grip the same.

2. In a trestle, a horizontal bar, spaced supporting legs, a pressed sheet metal housing surrounding the upper end of each leg, said housings being arranged in facing pairs, each housing having laterally-extending perforated ears and having an upwardly-extending jaw to engage the horizontal bar, a bolt extending through the perforations for drawing the housings about the legs, and a transversely-arranged bolt passing through the housings above the legs and beneath the transverse bar for firmly holding the jaws in contact with the horizontal bar to grip the same, each housing having inwardly-extending ledges to serve as stops for the legs, and outwardly-extending ears for supporting the horizontal bar.

3. In a trestle, a horizontal bar, spaced supporting legs, a pressed sheet metal housing surrounding the upper end of each leg, said housings being arranged in facing pairs, each housing having laterally-extending perforated ears and having an upwardly-extending jaw to engage the top, one side and the bottom of the horizontal bar, a pivot member extending through the perforations for drawing the housings about the legs, and means for firmly holding the jaws in contact with the horizontal bar to grip the same.

4. In a trestle, a horizontal bar, spaced supporting legs, a pressed sheet metal housing surrounding the upper end of each leg, the housing spreading downwardly for easy insertion of the leg, the upper portion of the housing having an inwardly-extending bead to grip the upper end of each leg, said housings being arranged in facing pairs, each housing having laterally-extending perforated ears and having an upwardly-extending jaw to engage the horizontal bar, a bolt extending through the perforations for drawing the housings about the legs, and means for firmly holding the jaws in contact with the horizontal bar to grip the same.

JOSEPH F. KACENA.